J. W. DAVIS.
Pantaloons, &c.
No. 6,335. Reissued March 16, 1875.
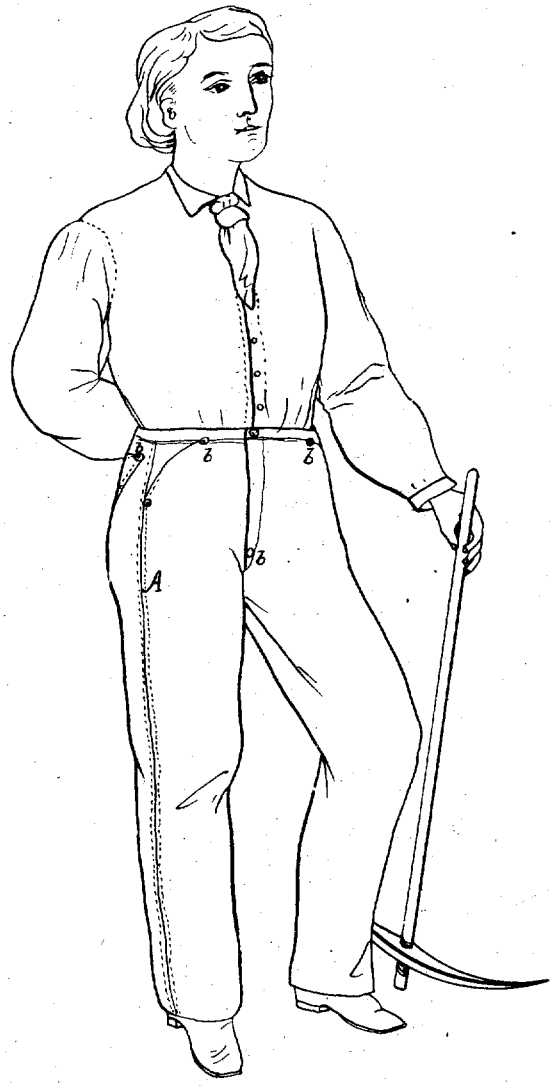
WITNESSES
G. B. Townsend
Neil H. Mason
By
INVENTOR.
Jacob W. Davis
per A. H. Evans & Co
Attorney

UNITED STATES PATENT OFFICE.

JACOB W. DAVIS, OF RENO, NEVADA, ASSIGNOR TO HIMSELF AND LEVI STRAUSS & CO., OF SAN FRANCISCO, CALIFORNIA.

IMPROVEMENT IN PANTALOONS, &c.

Specification forming part of Letters Patent No. 139,121, dated May 20, 1873; reissue No. 6,335, dated March 16, 1875; application filed February 27, 1875.

*To all whom it may concern:*

Be it known that I, JACOB W. DAVIS, of Reno, Washoe county, State of Nevada, have invented an Improvement in Fastening Seams; and I hereby declare the following to be a full, clear, and exact description thereof, reference being had to the accompanying drawings, making part of this specification.

My invention relates to a fastening for pocket-openings, whereby the sewed seams are prevented from ripping or starting from frequent pressure or strain thereon; and it consists in the employment of a metal rivet or eyelet at each edge of the pocket-opening, to prevent the ripping of the seam at those points.

The rivet or eyelet is so fastened in the seam as to bind the two parts of cloth which the seam unites together, so that it shall prevent the strain or pressure from coming upon the thread with which the seam is sewed.

In order to more fully illustrate and explain my invention, reference is had to the accompanying drawing, in which my invention is represented as applied to the pockets of a pair of pants.

Figure 1 is a view of my invention as applied to pants.

A represents the side seam in a pair of pants, which terminates at the pockets, and *b b* represent the rivets at each edge of the pocket-opening.

The seams are usually ripped or started by the placing of the hands in the pockets, and the consequent pressure or strain upon them. To strengthen this part I employ a rivet, eyelet, or other equivalent metal stud, *b*, which I pass through a hole at the end of the seam, so as to bind the two parts of cloth together, and then head it down on both sides, so as to firmly unite the two parts.

When rivets which already have one head are used, it is only necessary to head the opposite end, and a washer can be interposed, if desired, in the usual way.

By this means I avoid a large amount of trouble in mending portions of seams which are subjected to constant strain.

My invention is applicable to pantaloons, overalls, coats, vests, and other garments.

I am aware that rivets have been used for securing seams in shoes, as shown in the patent to Geo. Houghton, No. 64,015, April 23, 1867, and to L. K. Washburn, No. 123,313, January 3, 1872; and hence I do not claim, broadly, fastening of seams by means of rivets.

Having thus described my invention, what I claim as new, and desire to secure by Letters Patent, is—

As a new article of manufacture, pantaloons or other garments having their pocket-openings secured at the edges by means of rivets, or their equivalents, substantially in the manner described and shown.

In witness whereof I hereunto set my hand and seal.

JACOB W. DAVIS. [L. S.]

Witnesses:

JNO. L. BOONE,

GEO. H. STRONG.